United States Patent Office 2,918,354
Patented Dec. 22, 1959

2,918,354

CONVERSION OF HYDROGEN IODIDE TO IODINE

Shelton E. Steinle, Richmond, and Charles R. Greene, Berkeley, Calif., assignors to Shell Development Company, New York, N.Y., a corporation of Delaware No Drawing. Application October 18, 1956
Serial No. 616,591

4 Claims. (Cl. 23—216)

This invention relates to a process for recovering elemental iodine from hydrogen iodide. More particularly, this invention relates to a process for oxidizing hydrogen iodide to iodine, employing molecular oxygen as the oxidizing agent.

According to the art, hydrogen iodide is oxidized to elemental iodine by molecular oxygen, the reaction occurring in either the vapor of the liquid phase. It has been found that the reaction between hydrogen iodide and molecular oxygen in the vapor phase proceeds at practical rates only at very high temperatures—e.g., at red heat, or temperatures in the order of 600° C.—and that at such temperatures mixtures of hydrogen iodide, iodine and water are extremely corrosive to most of the common materials of construction. Vapor phase oxidation of hydrogen iodide thus does not lend itself to the conversion of hydrogen iodide to iodine under practical circumstances. Further, we have found that when the reaction of hydrogen iodide with molecular oxygen is carried out in the aqueous liquid phase, the reaction rates are impractically low, even when such devices as mixers, packed towers, towers containing bubble-plates, or foams of the gaseous and liquid phases are employed to insure intimate contact between the gaseous molecular oxygen and the aqueous liquid phase, and substantial partial pressures of molecular oxygen are used.

However, we have unexpectedly found that when an aqueous solution of hydrogen iodide in water is dispersed in an extremely finely divided form, that is, atomized, in an atmosphere containing a substantial partial pressure of molecular oxygen, substantially complete oxidation of the hydrogen iodide occurs at a very rapid rate.

This discovery provides basis for a practical process for the conversion of hydrogen iodide to iodine. Briefly, this process in its broad aspect comprises introducing an aqueous solution of hydrogen iodide in the form of very small droplets—i.e., atomizing the solution—into an atmosphere containing a substantial partial pressure of molecular oxygen, maintaining the dispersion of the liquid droplets in said atmosphere for a sufficient time to permit substantially complete oxidation of the hydrogen iodide, and recovering the product iodine from the reaction zone.

By conducting the reaction of hydrogen iodide with molecular oxygen in this manner, substantially quantitative conversion of the hydrogen iodide to elemental iodine is effected in but a few seconds, whereas residence times in the order of ten minutes or more are required when other methods are used.

Our new process effects the oxidation of hydrogen iodide from any aqueous solution thereof. That is to say, mixtures of hydrogen iodide and water as the only components may be used, or mixtures of hydrogen iodide and water containing other materials may be used, provided those other materials are substantially inert in the reaction system hereinafter described, or do not adversely affect the desired reaction between hydrogen iodide and molecular oxygen. Thus, solutions of hydrogen iodide in water containing other anions, such as alkali metal ions, or other cations, such as the phosphate ion, or the like, may be used in the process of the invention. As will be pointed out in greater detail hereinafter, hydrogen ion catalyzes the reaction between hydrogen iodide and molecular oxygen, and therefore may desirably be present in the solution of hydrogen iodide. The presence of substantial amounts of elemental iodine in the hydrogen iodide solution does not appear to inhibit or limit the oxidation of hydrogen iodide, despite the fact that it might be expected that since iodine is the product of the oxidation, the presence of added iodine might adversely affect the oxidation of hydrogen iodide. If desired, other water-soluble but non-ionized materials may be present in the hydrogen iodide solution, again provided these materials are inert or do not interfere with the oxidation of hydrogen iodide.

The concentration of hydrogen iodide in the solution is not critical—the new process effects oxidation of hydrogen iodide from very dilute aqueous solutions, or from concentrated aqueous solutions. From the standpoint of operating efficiency, it is desirable, of course, that the hydrogen iodide concentration in the solution be as high as is economically feasible. The concentration of hydrogen iodide in the solution preferably should not exceed the concentration of hydrogen iodide in the constant boiling mixture of hydrogen iodide and water at the pressure used. Thus, the hydrogen iodide concentration should not exceed about 57% by weight at one atmosphere pressure. When the hydrogen iodide concentration is less than the concentration of hydrogen iodide in the constant boiling mixture, as the droplets of the solution of hydrogen iodide contact the molecular oxygen containing gas, some water and any iodine present in the droplets pass into the gas phase. As the hydrogen iodide is converted to iodine, this iodine also passes into the gas phase. Substantially no hydrogen iodide passes into the gas phase. If the hydrogen iodide concentration in the solution is greater than the concentration of hydrogen iodide in the constant-boiling mixture, then hydrogen iodide will also pass into the gas phase. At the temperatures contemplated in the process of this invention, hydrogen iodide reacts but very slowly with molecular oxygen in the vapor phase. Hence, it is desirable to maintain the hydrogen iodide in the liquid phase; this is accomplished by maintaining the hydrogen iodide concentration in the aqueous liquid phase below the concentration of hydrogen iodide in the constant-boiling mixture, hydrogen iodide and water.

Molecular oxygen from any source may be used. Thus, pure oxygen is suitable as are mixtures of molecular oxygen with other, inert gases, such as commercially pure (95%) oxygen, oxygen-enriched air, or air itself.

According to our discovery, oxidation of hydrogen iodide by molecular oxygen is effected at high rates by forming very fine droplets of the aqueous solution of hydrogen iodide—that is, atomizing the solution—introducing and thoroughly dispersing these droplets into an atmosphere containing a substantial partial pressure of molecular oxygen and maintaining this dispersion for a sufficient time to permit the desired degree of oxidation of the hydrogen iodide. Break-up of the mass of the hydrogen iodide solution into very small droplets is accomplished by any of the means known in the art for breaking-up a liquid into very small droplets. Thus, such devices as spray nozzles, including pressure nozzles, fan nozzles, hollow-cone nozzles, solid-cone nozzles, impact nozzles, "fog" nozzles and rotating nozzles, gas-atomizing nozzles, and the like, may be used for this purpose. Suitable means for breaking-up a liquid into very fine droplets are set out and discussed in "Chemical Engineer's Handbook," Perry, 3d Edition, 1950, in the subsection thereof entitled "Spraying," pages 1169–1175. It is desirable that the droplets of the hydrogen iodide solution be as small as is feasible, since it has been found that the smaller the droplet size, the faster the hydrogen iodide oxidation rate. It is preferred that the droplet size not exceed about 500 microns, and optimum reaction rates are obtained when the droplet size is about 200 microns or even less.

Dispersion of the droplets of solution into the atmosphere containing the molecular oxygen-containing gas and maintenance of that dispersion for the necessary time also are accomplished by any of the known means. In some cases, this means merely spraying the droplets into the atmosphere; in other cases, it is desirable that the atmosphere be thoroughly agitated as the droplets are introduced into it, thus aiding in dispersion of those droplets and in maintaining the dispersion by preventing recombination of the droplets into larger droplets.

A particularly convenient and effective method for effecting the break-up of the hydrogen iodide solution into very small droplets, with concurrent dispersion of those droplets into the molecular oxygen-containing gas and maintenance of that dispersion, is to use a gas-atomizing nozzle which ejects directly into a reaction zone. In this type of nozzle, the liquid is broken up by impingement with a high-velocity stream of gas. By using the molecular oxygen-containing gas as the gas employed in the nozzle to break up the solution, dispersion of the droplets of the solution is effected simultaneously with the formation of those droplets, and since the oxidation of hydrogen iodide occurs very rapidly, little additional precaution to maintain the dispersion for the necessary reaction time is required. This embodiment of the process of the invention is preferred. It will be noted that in this embodiment, the reaction zone will include both the gas-atomizing nozzle and the time zone into which the nozzle injects the dispersion of the droplets of hydrogen iodide solution in the molecular oxygen-containing gas.

The amount of molecular oxygen charged is preferably at least the amount theoretically required to convert all of the hydrogen iodide present in the aqueous solution to elemental iodine. In some cases, it may be found convenient and/or desirable to limit the amount of molecular oxygen charged to somewhat less than the theoretical minimum. Generally, however, to insure maximum conversion of the hydrogen iodide, it is desirable that the amount of molecular oxygen fed be moderately in excess of the theoretical minimum. Thus, in such cases, normally it will be found desirable to maintain at least about a 25% excess of molecular oxygen in the reaction zone, and in some cases as much as a 200-fold excess of oxygen will be found desirable. Preferably, the excess of oxygen is at least 50%, but an excess of more than about 100-fold will not often be required, for such large excesses provide little advantage over somewhat lesser excesses and are usually uneconomic and present operating difficulties.

It is essential to the effective oxidation of hydrogen iodide that there be a substantial partial pressure of molecular oxygen in the reaction zone. Thus, the oxygen partial pressure should be at least 10 p.s.i., and optimum oxidation rates are usually obtained only when the oxygen partial pressure is 20 p.s.i. or more. While much higher oxygen partial pressures—for example, up to 200 p.s.i. or even more—may be used, in general little advantage results from the use of oxygen partial pressures in excess of about 100 p.s.i.

If desired, a catalyst for the reaction between hydrogen iodide and molecular oxygen may be included in or with the solution of hydrogen iodide fed to the reaction zone. It has been found that any acid material will catalyze the reaction. Thus, any acid material which is sufficiently stable in the reaction zone, or which does not adversely affect the oxidation of hydrogen iodide, which has the requisite physical characteristics, and which is not unduly costly, may be used as catalyst. The number of acid materials which may be used for the purpose has been found to be quite small. Thus, we, together with our coworkers, have found that solid materials having substantial intrinsic surface acidity, such as the known clay-type hydrocarbon cracking catalyst, are excellent catalysts for the reaction. Also, we have found that the so-called "Lewis acids," such as the various heavy metal salts of strong mineral acids, are effective catalysts. Any material which gives a substantial hydrogen ion concentration in aqueous solutions is an effective catalyst for the reaction of hydrogen iodide with molecular oxygen. Our coworkers have discovered that of the strong mineral acids, only phosphoric acid is sufficiently stable, sufficiently non-volatile and sufficiently inexpensive for practical use. Our coworker, Gino Pierotti discloses the use of phosphoric acid as the catalyst for the reaction of hydrogen iodide with molecular oxygen in his co-pending application Serial No. 601,570, filed August 1, 1956, now Patent No. 2,870,066. Where phosphoric acid is used as the catalyst, the necessary concentration of the catalyst in the solution, and other factors bearing on the liquid-phase oxidation of hydrogen iodide by molecular oxygen in the presence of phosphoric acid as catalyst are set out in this co-pending application.

We have discovered that of the strong organic acids, only the alkane sulfonic acids are practically useful as the catalyst. The use of such alkane sulfonic acids as the catalyst forms the subject matter of our copending application Serial No. 622,771, filed November 19, 1956, now Patent No. 2,874,031. The pertinent factors bearing on the use of one or more alkane sulfonic acids as the catalyst are set out and discussed in detail in our copending application.

While any acid material may be used as the catalyst in the process of the invention, provided the means used to break-up the hydrogen iodide solution into small droplets also is adapted to the particular physical nature of the catalyst used, obviously water-soluble strong acids, such as phosphoric acid or one or more alkane sulfonic acids are the most convenient materials to use as the catalyst. Use of such water-soluble catalysts does not introduce the problem of having to break up a heterogeneous liquid-solid mixture into fine droplets, or otherwise provide for the use of a solid, albeit finely divided, catalyst.

The conversion of hydrogen iodide to iodine is effected at any temperature above about 50° C.; however, the reaction rate increases significantly with an increase in temperature, so that somewhat higher temperatures normally lead to higher conversions of hydrogen iodide in shorter residence times. Since hydrogen iodide and molecular oxygen react but very slowly in the vapor phase at temperatures below about 300° C., it is desirable that the temperature in the reaction zone be such that the water in the droplets of hydrogen iodide solution does not completely evaporate until after all of the hydrogen iodide therein has been converted to iodine, and such that at all times the concentration of hydrogen iodide in the droplets remains below the concentration of hydrogen iodide in a constant-boiling mixture of hydrogen iodide and water. Accordingly, it is preferred that the reaction temperature not exceed substantially the temperature at which the hydrogen iodide solution boils under the operating pressure. Preferably, the temperature is at least about 80° C. Temperatures substantially above the boiling temperature of the hydrogen iodide solution may sometimes be used to advantage, provided that due precautions are taken to insure the necessary water-to-hydrogen iodide ratios in the droplets of the hydrogen iodide solution. Desirably, the reactor conditions are so chosen that the hydrogen iodide concentration in the droplets of solution approaches but does not exceed the concentration of hydrogen iodide in the constant-boiling mixture of hydrogen iodide and water, since this technique effects oxidation of the hydrogen iodide from the most concentrated solution thereof which may be effectively used.

The conversion of hydrogen iodide to iodine may be carried out at any convenient pressure. The minimum pressure which can be used normally will be determined by the molecular oxygen partial pressure desired. If pure oxygen is used, then the system pressure will normally not be substantially greater than the oxygen pressure used. If air, or other mixture of oxygen with an inert gas is used, then the system pressure will be correspondingly greater to furnish the requisite oxygen partial pressure. In some cases, use of elevated pressures may be desirable to reduce the volume of gases handled and/or to increase the boiling temperature of the hydrogen iodide solution in the reaction zone. Pressures in excess of about 500 p.s.i.g. will seldom be found advantageous or desirable, as compared to somewhat lower pressures.

At the temperatures and pressures set out above, practically feasible hydrogen iodide conversion levels are obtained in very short residence times. For example, when operating in the preferred temperature range of from about 80° C. to about 150° C., hydrogen iodide conversion levels of 70% or more can be obtained at residence times of the magnitude of about two to five seconds.

Recovery of the product iodine from the effluent from the reaction zone may be effected by known methods, the method used depending upon the extent of the hydrogen iodide conversion and whether any of the gaseous portion of the reaction mixture is withdrawn from the reaction zone. With respect to the liquid phase, if the conversion of hydrogen iodide to iodine is substantially 100%, the product iodine is substantially immiscible with the aqueous phase and the two phases may be separated by decantation where the iodine is liquid, or by filtration, centrifuging or the like, where the iodine is solid. Where the conversion of hydrogen iodide is incomplete, the aqueous phase will contain both iodine and hydrogen iodide. In many cases, it will be found possible to so control the degree of hydrogen iodide conversion and the amount of water in the aqueous phase so that the amount of iodine formed exceeds substantially the amount of iodine which will dissolve in the hydrogen iodide solution. This permits direct removal of a substantial part of the product iodine by simple phase separation. The iodine dissolved in the hydrogen iodide solution may be recovered by treating the solution with a strong oxidizing agent, such as chlorine, to convert the remaining hydrogen iodide to iodine, and separating the iodine from the solution by simple phase separation. Alternatively, the iodine dissolved in the hydrogen iodide solution may be recovered by passing an inert gas through the solution and recovering iodine from the effluent gases. This method for selectively removing iodine from mixtures of iodine, hydrogen iodide and water is disclosed and claimed in copending application Serial No. 594,893, filed June 29, 1956. In some cases, it may be found most convenient and desirable to simply separate the iodine phase from the aqueous phase and recycle the aqueous phase, containing water, hydrogen iodide, iodine and the catalyst, if one was used, to the reaction zone.

Another, and preferred method for conducting the process of the invention, comprises controlling the amount of oxygen-containing gas, the temperature, residence time, the hydrogen iodide-to-water ratio and other process conditions in the manner and within the respective limits set out hereinbefore, which will permit withdrawal of a portion of the gas phase of the reaction mixture during the reaction. The primary criterion is to maintain the hydrogen iodide concentration in the droplets of solutions below the concentration of hydrogen iodide in the constant-boiling mixture of hydrogen iodide and water. When this condition is fulfilled, it will be found that any iodine contained in the droplets of hydrogen iodide solution, including the iodine resulting from oxidation of the hydrogen iodide, will pass into the gas phase, that some of the water will also pass into into the gas phase, but that substantially none of the hydrogen iodide will pass into the gas phase. The iodine is easily recovered from the gaseous effluent withdrawn from the reaction zone, by cooling those gases and separating the iodine from the immiscible water.

This method of operation is essential where no catalyst is used, for it has been found that when the oxidation of an aqueous solution of hydrogen iodide has progressed until the number of moles of iodine formed and dissloved therein is equal to the number of moles of hydrogen iodide remaining, the oxidation rate falls off tremendously—substantially no further reaction occurs. This situation may be avoided by removing the iodine so as to maintain the iodine-to-hydrogen iodide mole ratio below 1.0. Removal of the iodine is conveniently effected by passing an inert gas through, or in contact with the solution. (See copending application Serial No. 594,893.) The "inert gas" most conveniently is the molecular oxygen-containing gas. This method is not essential where a catalyst is used, since in the presence of a catalyst, the iodine-to-hydrogen iodide mole ratio apparently is of no significance with respect to the extent to which the hydrogen iodide is converted to iodine. The method often is convenient for effecting the recovery of the product iodine, as well as for effecting the desired reaction.

It will be obvious from the preceding description of our invention that while the new process lends itself well to batch operation, it finds its greatest effectiveness when used in a continuous manner.

This constitutes a general description of the process of our invention; the following examples illustrate specific applications of this process. It is to be understood that these examples are set out for the purpose of illustration only and that the invention is not to be regarded as limited in any way to the specific conditions cited therein.

*Example I*

A solution of hydrogen iodide in water, containing 27.5% by weight hydrogen iodide, was fed to a gas atomizing nozzle, wherein it was dispersed into small droplets by a stream of molecular oxygen, and the dispersion of the solution in the oxygen was passed into a vertical free-space reactor in which there was maintained a pressure of 60 p.s.i.g. oxygen. The gas atomizing nozzle was constructed of glass and consisted of a small tube 0.25 mm. inside diameter and 1 mm. outside diameter concentrically mounted in a large tube. The large tube was 2 mm. inside diameter at the end of the small tube and was 1.5 mm. inside diameter at the discharge end of the large tube 3 mm. from the end of the small tube. The hydrogen iodide solution was fed to the small tube at a rate of about 5 cubic centimeters per minute. Oxygen was charged to the large tube upstream from the end of the small tube at a pressure of approximately 100 p.s.i.g. The oxygen-to-hydrogen iodide mole ratio was 7.8:1. The reactor was maintained at a temperature of 109° C. The dispersed liquid was maintained in the reactor for 2.9 seconds and then was withdrawn and analyzed for its free iodine content. It was found that 55.5% of the hydrogen iodide had been converted to iodine.

*Example II*

The experiment of Example I was repeated, with the exceptions that the reaction temperature was 120° C. and the residence time was 4.8 seconds. 70.5% of the hydrogen iodide was converted to iodine.

Example III

The experiment of Example I was repeated several times; in each case, there was added to the solution of hydrogen iodide 2% by weight of that solution of Alkanesulfonic Acid. This acid is a commercial product of the Indoil Chemical Co. It is a mixture of methane-, ethane- and n-propanesulfonic acids having an average molecular weight of 110. The commercial product has the following composition: sulfonic acids—94% w.; water—5% w.; sulfuric acid—1% w.; ash—0.01% w. Other properties of this commercial product are summarized in Bulletin No. 11, Indoil Chemical Co., entitled "Alkanesulfonic Acid," issued in 1952.

The following table summarizes the reaction temperature and residence times used, and the conversions obtained in the various experiments:

| Run | Temperature (°C.) | Residence Time (Seconds) | Conversion (Percent) |
| --- | --- | --- | --- |
| 1 | 111 | 2.1 | 74 |
| 2 | 119 | 2.4 | 80 |
| 3 | 115 | 4.7 | 93 |
| 4 | 119 | 7.2 | 93 |
| 5 | 114 | 9.0 | 91 |
| 6 | 119 | 8.7 | 93 |
| 7 | 123 | 4.7 | 91 |
| 8 | 123 | 12.2 | 92 |

Example IV

The advantages of conducting the oxidation of hydrogen iodide with molecular oxygen according to our invention, compared to conducting the oxidation by other means are demonstrated by the results of experiments we have made. In these experiments, a solution of 20% by weight of hydrogen iodide in water was oxidized. The temperatures used were in the range 120–125° C. Oxygen partial pressure in all cases was 60 p.s.i.g. In the first experiment, the oxidation was carried out in a reactor fitted with a stirrer, and the reaction mixture was thoroughly stirred throughout the reaction period. The oxygen-to-hydrogen iodide mole ratio was 74:1. In the second experiment, the oxidation was carried out by passing the solution of hydrogen iodide countercurrent to the oxygen-containing gas in a tower packed with glass beads 5 millimeters in diameter. The oxygen-to-hydrogen iodide mole ratio was 75:1. In the third experiment, the reaction was conducted by passing the solution of hydrogen iodide countercurrent to the oxygen-containing gas in a tower fitted with bubblecap trays. The contactor was an Oldershaw-bubble-plate column containing 20 plates. The oxygen-to-hydrogen iodide mole ratio was 200:1. In the fourth experiment, the oxidation of hydrogen iodide was conducted in the manner set out in Example I. The oxygen-to-hydrogen iodide mole ratio was 6.5:1. The average residence time required in each case to give a 50% conversion of hydrogen iodide was determined in each case. The results are summarized in the following table:

| Run | Type of Contact Device | Residence Time Required for 50% Conversion |
| --- | --- | --- |
| 1 | Stirrer | 12 minutes. |
| 2 | Packed column | 30 minutes. |
| 3 | Bubble-cap tray column | 10 minutes. |
| 4 | Gas atomizing nozzle | 3.5 seconds. |

The advantages gained by conducting the oxidation of hydrogen iodide according to the process of the invention thus are quite evident, a given level of hydrogen iodide conversion being obtained in less than one-one hundredth of the time required by the best of the other methods tried. The practical nature of the new process also is demonstrated by the results of our experiments.

While the process of this invention is applicable to effect the oxidation of hydrogen iodide from any source, the process is of primary interest for recovering elemental iodine from the effluents of processes which employ iodine as a reactant to remove hydrogen atoms from organic materials, thus changing the carbon-to-carbon structures of such materials. In such processes, since one mole of hydrogen iodide is formed per hydrogen atom removed, the effluent vapors contain large amounts of hydrogen iodide. Also, in many cases, the product of the dehydrogenation is quite reactive with hydrogen iodide and/or iodine at the reaction temperatures, and to prevent undesirable side-reactions it is necessary to substantially reduce the temperature of the effluent gases immediately on their emergence from the reactor, and/or to dilute those gases substantially. Such quenching and/or dilution often is most conveniently accomplished by quenching the effluent gases with water, or by adding steam to the effluent gases; in these cases, the source of hydrogen iodide also contains water. Since iodine is expensive, it must be recovered from such effluent streams. The process of the invention is admirably suited to recovery of iodine from hydrogen iodide contained in the effluent streams from such processes, for it effects the oxidation of hydrogen iodide directly from such effluent streams. Further, the process of the invention is eminently suited for the conversion of large amounts of hydrogen iodide, for it employs a very cheap widely available oxidizing agent (oxygen), is operationally quite simple and effects a high degree of conversion of hydrogen iodide under practically feasible operating conditions.

In some cases, it may be found desirable to conduct the oxidation of hydrogen iodide in two or more consecutive stages, employing the process of this invention in each of the stages. In such operation, the oxidation of hydrogen iodide in each stage may be conducted in the presence of the same or a different catalyst, or it may be conducted without the aid of a catalyst. In some cases, it will be found desirable to remove the product iodine formed in each stage, the iodine-free effluent being passed to the next stage. Also, it may be found desirable to increase the concentration of hydrogen iodide in the effluent of one stage before that effluent is passed to the next stage. Such reconcentration of the effluent can be conveniently effected by fractionation of the liquid effluent to remove water overhead. It will be appreciated that these, and other modes of applying principle of the invention, may be employed, and obviously many modifications and variations of the invention, as hereinbefore set forth, may be made without departing from the spirit and scope of the invention, as disclosed hereinbefore and as defined in the hereto appended claims.

We claim as our invention:

1. The process for converting hydrogen iodide to iodine which comprises dispersing a liquid aqueous solution of hydrogen iodide in the form of very small droplets in an atmosphere containing a partial pressure of molecular oxygen of at least ten pounds per square inch and maintained at a temperature of at least about 50° C. in a reaction zone, with the proviso that in said hydrogen iodide solution, the concentration of hydrogen iodide does not exceed the concentration of hydrogen iodide in the constant boiling mixture of hydrogen iodide and water which exists under the total pressure employed in said reaction zone, thereby converting a substantial part of the hydrogen iodide to iodine, and recovering iodine substantially free of hydrogen iodide from the vapor phase from said reaction zone.

2. The process for converting hydrogen iodide to iodine which comprises atomizing a liquid aqueous solution of hydrogen iodide in an atmosphere containing a partial pressure of molecular oxygen of at least ten pounds per square inch and maintained at a temperature of at least about 50° C. in a reaction zone, with the proviso that in said hydrogen iodide solution, the concentration of hydrogen iodide does not exceed the concentration of hydrogen iodide in the constant boiling mixture of hydrogen iodide and water which exists under the total pressure employed in said reaction zone, thereby converting a substantial part of the hydrogen iodide to iodine, and recovering iodine substantially free of hydrogen iodide from the vapor phase from said reaction zone.

3. The process for converting hydrogen iodide to iodine which comprises dispersing a liquid aqueous solution of hydrogen iodide in the form of very small droplets in an atmosphere containing a partial pressure of molecular oxygen of from about 20 to about 200 pounds per square inch and maintained at a temperature of from about 80° C. to the boiling temperature of the said liquid aqueous solution of hydrogen iodide in a reaction zone, with the proviso that in said hydrogen iodide solution, the concentration of hydrogen iodide does not exceed the concentration of hydrogen iodide in the constant boiling mixture of hydrogen iodide and water which exists under the total pressure employed in said reaction zone, thereby converting a substantial part of the hydrogen iodide to iodine, and recovering iodine substantially free of hydrogen iodide from the vapor phase from said reaction zone.

4. The process for converting hydrogen iodide to iodine which comprises dispersing a liquid aqueous solution of hydrogen iodide in the form of droplets having an average diameter of up to about 500 microns in an atmosphere containing a partial pressure of molecular oxygen of at least ten pounds per square inch and maintained at a temperature of at least about 50° C. in a reaction zone, with the proviso that in said hydrogen iodide solution, the concentration of hydrogen iodide does not exceed the concentration of hydrogen iodide in the constant boiling mixture of hydrogen iodide and water which exists under the total pressure employed in said reaction zone, thereby converting a substantial part of the hydrogen iodide to iodine, and recovering iodine substantially free of hydrogen iodide from the vapor phase from said reaction zone.

References Cited in the file of this patent

UNITED STATES PATENTS

| | | |
|---|---|---|
| 1,148,194 | Seifert et al. | July 27, 1915 |
| 1,843,012 | Bucherer | Jan. 26, 1932 |
| 2,155,119 | Ebner | Apr. 18, 1939 |

OTHER REFERENCES

"General College Chemistry," by J. A. Babor and A. Lehrman, 1940 ed., page 329, Thomas Y. Crowell Co., N.Y.

Latimer: "Reference Book of Inorganic Chemistry," 3rd ed., p. 165 (1951), The Macmillan Co., N.Y.